(12) United States Patent
Arnold

(10) Patent No.: US 6,925,802 B2
(45) Date of Patent: Aug. 9, 2005

(54) SYSTEM TO IMPROVE AFTER-TREATMENT REGENERATION

(75) Inventor: Steven Don Arnold, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/384,355

(22) Filed: Mar. 7, 2003

(65) Prior Publication Data

US 2003/0209010 A1 Nov. 13, 2003

Related U.S. Application Data

(60) Provisional application No. 60/362,619, filed on Mar. 7, 2002.

(51) Int. Cl.⁷ .............................. F01N 3/00; F01N 7/04; F02D 21/08; F02D 41/02; F02D 41/34
(52) U.S. Cl. ..................... 60/602; 60/605.2; 60/284; 60/285; 60/313; 60/323; 123/568.11
(58) Field of Search ............................. 60/602, 605.2, 60/277, 284, 285, 295, 313, 323, 646, 657; 123/568.11, 568.2

(56) References Cited

U.S. PATENT DOCUMENTS

| | | | | |
|---|---|---|---|---|
| 6,014,859 A | * | 1/2000 | Yoshizaki et al. | 60/285 |
| 6,047,542 A | * | 4/2000 | Kinugasa et al. | 60/285 |
| 6,244,043 B1 | * | 6/2001 | Farmer et al. | 60/285 |
| 6,250,074 B1 | * | 6/2001 | Suzuki et al. | 60/285 |
| 6,347,514 B1 | * | 2/2002 | Takahashi et al. | 60/285 |
| 6,381,953 B1 | * | 5/2002 | Glugla et al. | 60/284 |
| 6,516,612 B1 | * | 2/2003 | Yokoi et al. | 60/285 |
| 6,694,726 B2 | * | 2/2004 | Sakai | 60/285 |

FOREIGN PATENT DOCUMENTS

| | | |
|---|---|---|
| DE | 197 31 129 A1 | 1/1999 |
| DE | 199 57 715 A1 | 6/2000 |
| DE | 199 35 341 A1 | 2/2001 |
| DE | 100 03 903 A1 | 8/2001 |
| DE | 100 05 954 A1 | 8/2001 |
| DE | 100 18 062 A1 | 10/2001 |
| DE | 101 01 593 A1 | 7/2002 |
| EP | 0 831 209 A1 | 3/1998 |
| EP | 0 969 186 A2 | 1/2000 |
| EP | 1 052 393 A2 | 11/2000 |
| FR | 2786529 A1 | 8/2000 |

OTHER PUBLICATIONS

Kazuhiro Akihama et al., "Mechanism of the Smokeless Rich Diesel Combustion by Reducing Temperature," Chemical Engineering Dept., Colorado School of Mines, Golden, CO 80401, Copyright 2001 Society of Automotive Engineers, Inc., pp. 1–15.

* cited by examiner

Primary Examiner—Sheldon J Richter
(74) Attorney, Agent, or Firm—Chris James

(57) ABSTRACT

Exemplary methods, devices, and/or systems are suitable for regenerating a plurality of after-treatment units. An exemplary method includes selecting less than all of a plurality of after-treatment units and adjusting air to fuel ratio for less than all of a plurality of combustion chambers of an engine to thereby cause the selected after-treatment units to receive exhaust having hydrocarbon and oxygen concentrations that favor regeneration of the selected after-treatment units. Other exemplary methods, devices and/or systems are also disclosed.

27 Claims, 11 Drawing Sheets

SYSTEM TO IMPROVE AFTER-TREATMENT REGENERATION

RELATED APPLICATIONS

This application claims the benefit of U.S. Provisional Application No. 60/362,619, filed Mar. 7, 2002, entitled "System to Improve After-treatment Regeneration".

TECHNICAL FIELD

This invention relates generally to methods, devices, and/or systems for improving after-treatment regeneration for an internal combustion engine.

BACKGROUND

As diesel engine emissions legislation becomes more stringent, a number of new technologies are under investigation and fall in the general category of "after-treatment". These technologies include, but are not limited to diesel particulate filters, oxidation catalysts, and NOx traps. Most after-treatment filters, catalysts, traps, etc., which may be referred to as after-treatment units, require some sort of "regeneration" to refresh their emissions reducing capacity.

Regeneration techniques vary from technology to technology, but usually involve changing either the temperature or equivalence ratio (e.g., air to fuel ratio relative to a stoichiometric ratio) of the exhaust. For example, a diesel particulate filter typically requires quite high temperatures to burn off particulates trapped in the filter. As another example consider the NOx trap, which typically requires regeneration several times per minute. During regeneration of a NOx after-treatment unit, the air to fuel ratio, which normally runs lean typically at approximately 19:1 to approximately 27:1 at full load and much higher at part load, is reduced to achieve rich combustion (e.g., an air to fuel ratio at or below approximately 14:1). However, various problems may be encountered when operating at such low air to fuel ratios. For example, depending on combustion temperature, unsatisfactory level of smoke may be generated at low air to fuel ratios.

Traditionally, an after-treatment unit is placed in an engine exhaust stream after an exhaust turbine. During regeneration, the engine is operated in a significantly different thermodynamic regime than during normal operation. The thermodynamic regime suited to regeneration may have a substantial impact on engine operation. For example, such a thermodynamic regime may confound control of torque to maintain a commanded level by an operator or control of an air management system that includes a turbocharger (e.g., to maintain a smooth airflow). In particular, during a typical 2 to 4 second NOx unit regeneration, a reduction in mass flow occurs across the entire engine, typically by a factor of approximately two. Such a reduction in mass flow results in unsatisfactory conditions for turbocharger operation. For example, during regeneration, a significant variation in turbine speed may occur, which may cause undesirable pressure gradients at the inlet manifold that can result in further outlet manifold pressure disturbances.

Overall, after-treatment regeneration presents tremendous challenges in engine management control and system design where acceptable emissions and operator satisfaction are imperative. Hence, a need exists for new or improved methods, devices and/or systems for after-treatment regeneration. Various exemplary methods, devices and/or systems presented below meet this need and/or other needs.

BRIEF DESCRIPTION OF THE DRAWINGS

A more complete understanding of the various exemplary methods, devices and/or systems described herein, and equivalents thereof, may be had by reference to the following detailed description when taken in conjunction with the accompanying drawings wherein.

DETAILED DESCRIPTION

Figure 1:
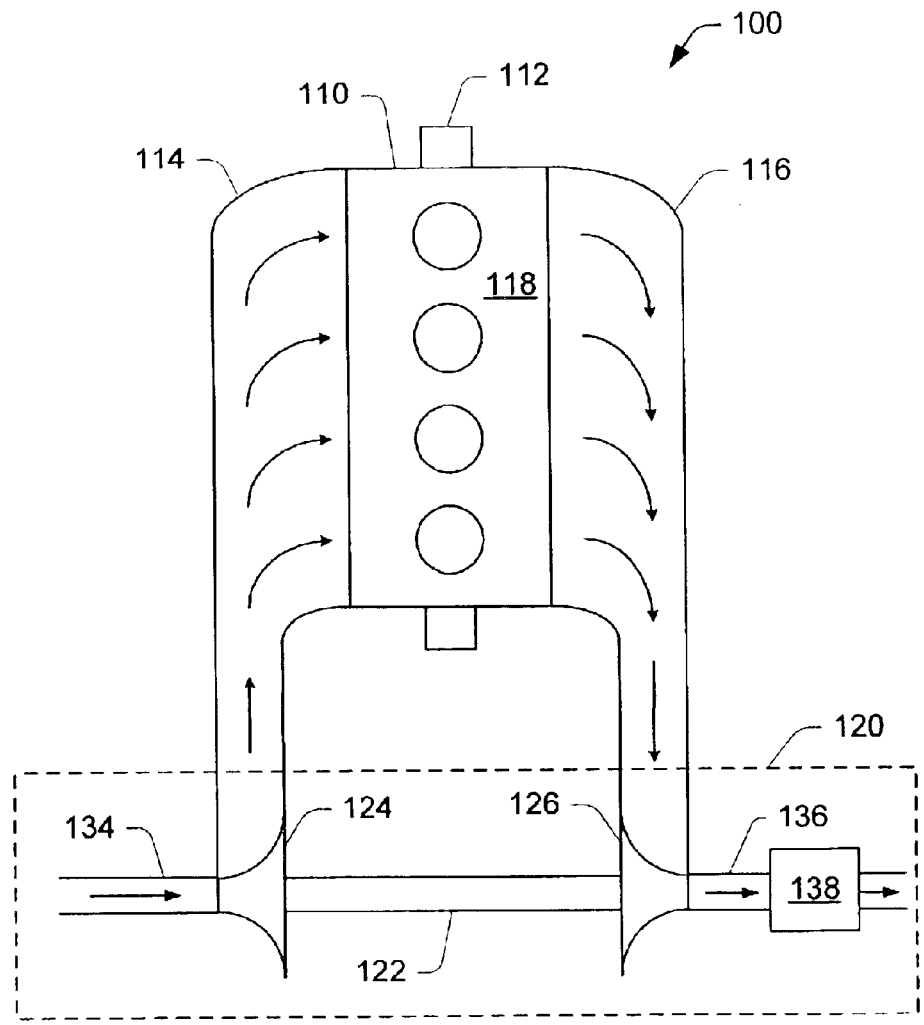
FIG. 1 is a simplified approximate diagram illustrating an exemplary system that includes a turbocharger and an internal combustion engine.

Turning to the drawings, wherein like reference numerals generally refer to like elements, various exemplary methods are illustrated as being implemented in a suitable control and/or computing environment. Although not required, various exemplary methods are described in the general context of computer-executable instructions, such as program modules, being executed by a computer and/or other computing device. Generally, program modules include routines, programs, objects, components, data structures, etc. that perform particular tasks or implement particular abstract data types.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks. In addition, various diagrams include individual "blocks" or "modules" that are optionally structural elements of a device and/or a system. For example, a "controller block" optionally includes a controller as a structural element, an "actuator block" optionally includes an actuator as a structural element, a "turbocharger block" optionally includes a turbocharger as a structural element, etc. In various blocks, structure and function are implied. For example, a controller block optionally includes a controller (e.g., a structure) for controlling an engine related parameter (e.g., a function).

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

FIG. 1 shows an exemplary system 100 that includes an exemplary internal combustion engine 110 and an exemplary turbocharger 120. The internal combustion engine 110 includes an engine block 118 housing one or more combustion chambers (e.g., cylinders, etc.) that operatively drive a shaft 112. As shown in FIG. 1, an intake manifold 114 provides a flow path for intake air to the engine block 118 while an exhaust manifold 116 provides a flow path for exhaust from the engine block 118.

The exemplary turbocharger 120 acts to extract energy from the exhaust and to use this energy to boost intake charge pressure (e.g., pressure of intake air, etc.). As shown in FIG. 1, the turbocharger 120 includes a shaft 122 having a compressor 124, a turbine 126, an intake 134, and an exhaust outlet 136. Exhaust from the engine 110 diverted to the turbine 126 causes the shaft 122 to rotate, which, in turn, rotates the compressor 124. When rotating, the compressor 124 energizes intake air to produces a "boost" in intake air pressure (e.g., force per unit area or energy per unit volume), which is commonly referred to as "boost pressure." In this manner, a turbocharger may help to provide a larger mass of intake air (e.g., typically mixed with a carbon-based and/or hydrogen-based fuel) to the engine, which translates to greater engine output during combustion.

An exhaust turbine or turbocharger optionally includes a variable geometry mechanism or other mechanism to control flow of exhaust to the exhaust turbine. Commercially available variable geometry turbochargers (VGTs) include, but are not limited to, the GARRETT® VNT™ and AVNT™ turbochargers, which use multiple adjustable vanes to control the flow of exhaust through a nozzle and across a turbine. Further, the exemplary system 100 may include a turbocharger or compressor having an associated electric motor and/or generator and associated power electronics capable of accelerating and/or decelerating a shaft (e.g., compressor shaft, turbine shaft, etc.). Power electronics may operate on DC power and generates an AC signal, or vice-versa, to drive a motor and/or generator.

The exemplary system further includes an after-treatment unit 138 positioned in the exhaust stream after the turbine 126. The after-treatment unit 138 is optionally a diesel particulate filter, oxidation catalyst, a NOx trap or some other type of after-treatment unit. Further, the after-treatment unit 138 may include one or more subunits or combination units capable of performing any of a variety of after-treatments. Conventional engine systems generally have one or more after-treatment units positioned in an exhaust stream after a turbocharger (e.g., after an exhaust turbine). As described herein, an after-treatment unit may be an individual unit or a block unit having a plurality of separate flow paths (e.g., subunits) wherein, for example, a flow path or subunit may be configured to receive exhaust from only part of an engine's exhaust stream (e.g., from a particular combustion chamber, etc.).

In general, after-treatment regeneration of any particular after-treatment unit is facilitated where a unit receives only part of an engine's exhaust stream. Hence, as described herein various exemplary methods, devices and/or systems include or operate one or more after-treatment units in an exhaust stream prior to an exhaust turbine. Further, various exemplary methods, devices and/or systems include or operate a plurality of after-treatment units wherein each of the plurality of units receives only part of an engine's exhaust stream. For example, an exemplary system includes one after-treatment unit for receiving exhaust from two combustion chambers (e.g., cylinder, etc.) and another after-treatment unit for receiving exhaust from two other combustion chambers wherein both after-treatment units treat the same emission component or components. Of course, other exemplary systems may include a one-to-one ratio of after-treatment units and engine combustion chambers (e.g., a four cylinder engine may have an exemplary system that includes one after-treatment unit per cylinder). Yet another exemplary system includes a plurality of after-treatment units wherein each of the plurality of units is positioned prior to an exhaust turbine and receives only part of an engine's exhaust stream.

Figure 2:
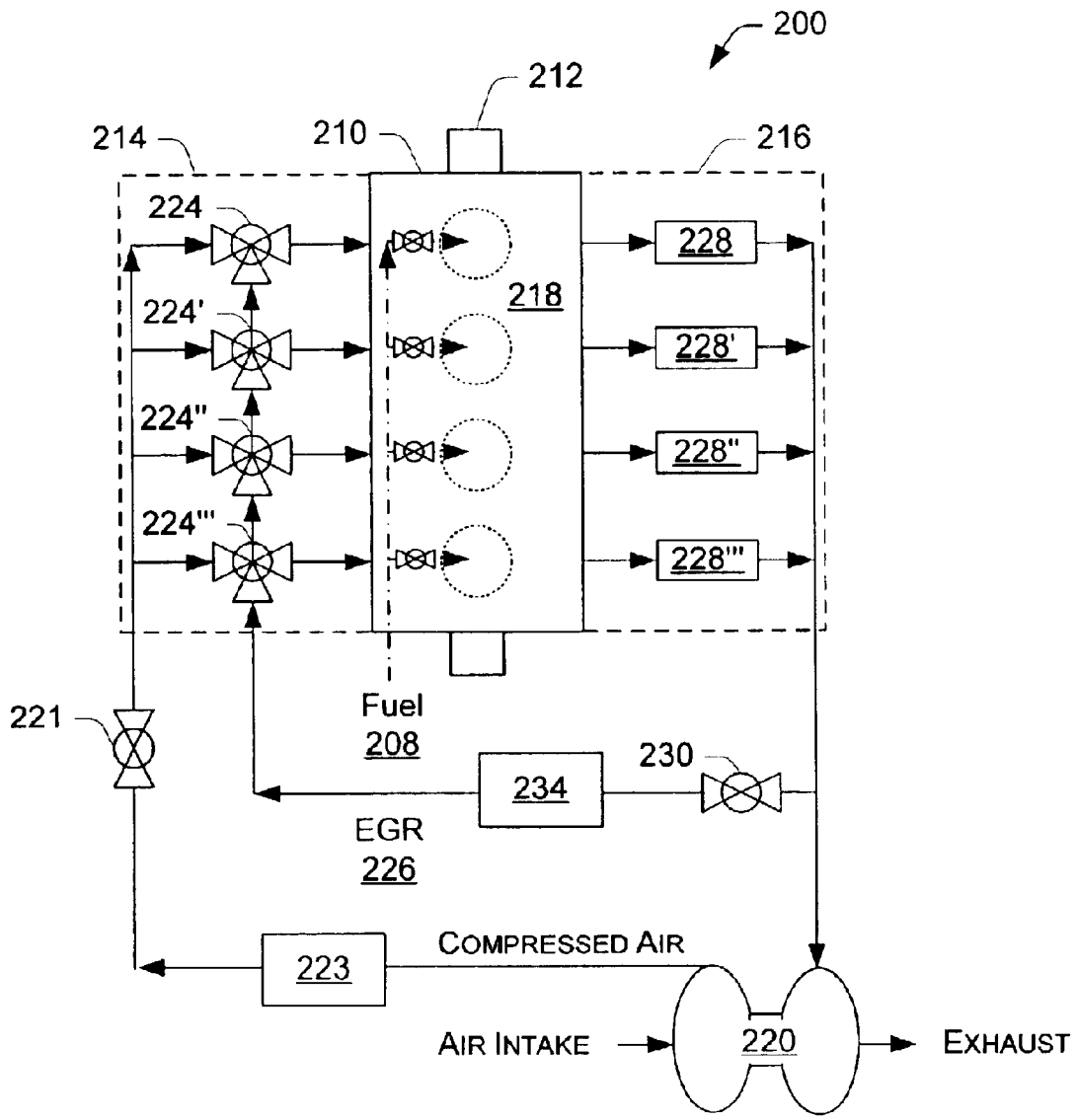
FIG. 2 is a simplified approximate diagram illustrating an exemplary system that includes a one-to-one correspondence between after-treatment units and combustion chambers and regulators to regulate at least EGR pressure and/or flow to individual combustion chambers.
Figure 3:
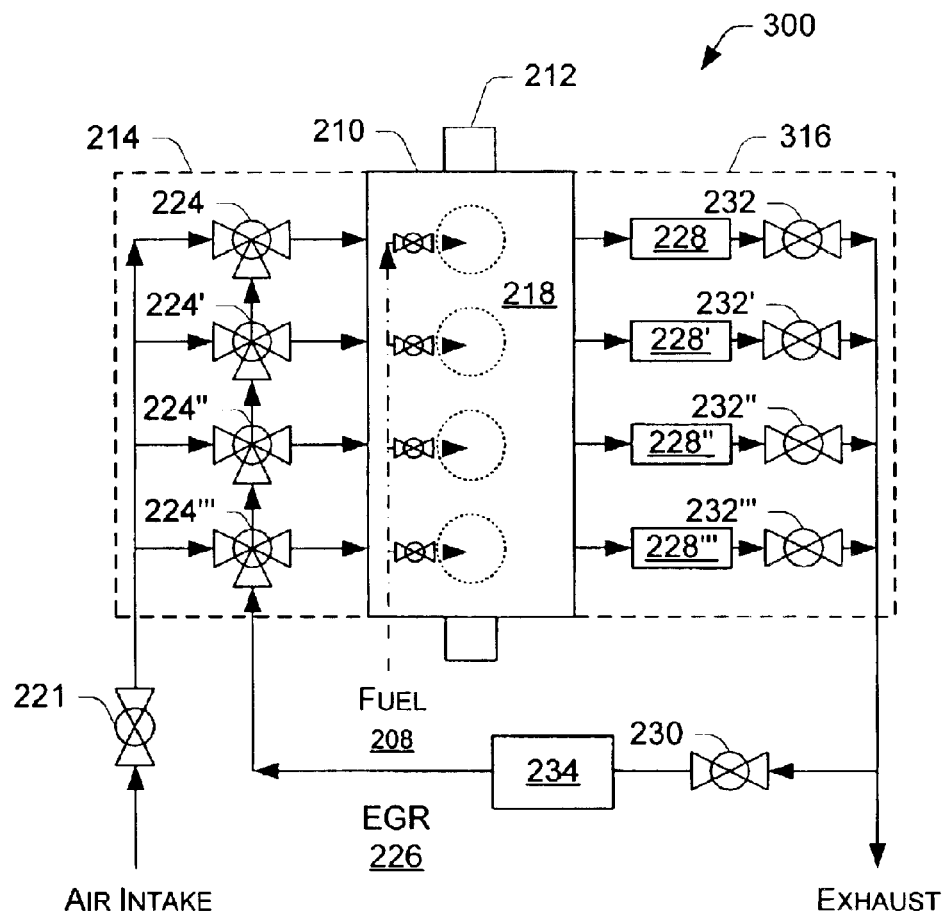
FIG. 3 is a simplified approximate diagram illustrating an exemplary system that includes a one-to-one correspondence between after-treatment units and combustion chambers, regulators to regulate at least EGR pressure and/or flow to individual combustion chambers and regulators to regulate pressure and/or flow to each of the after-treatment units.
Figure 4:
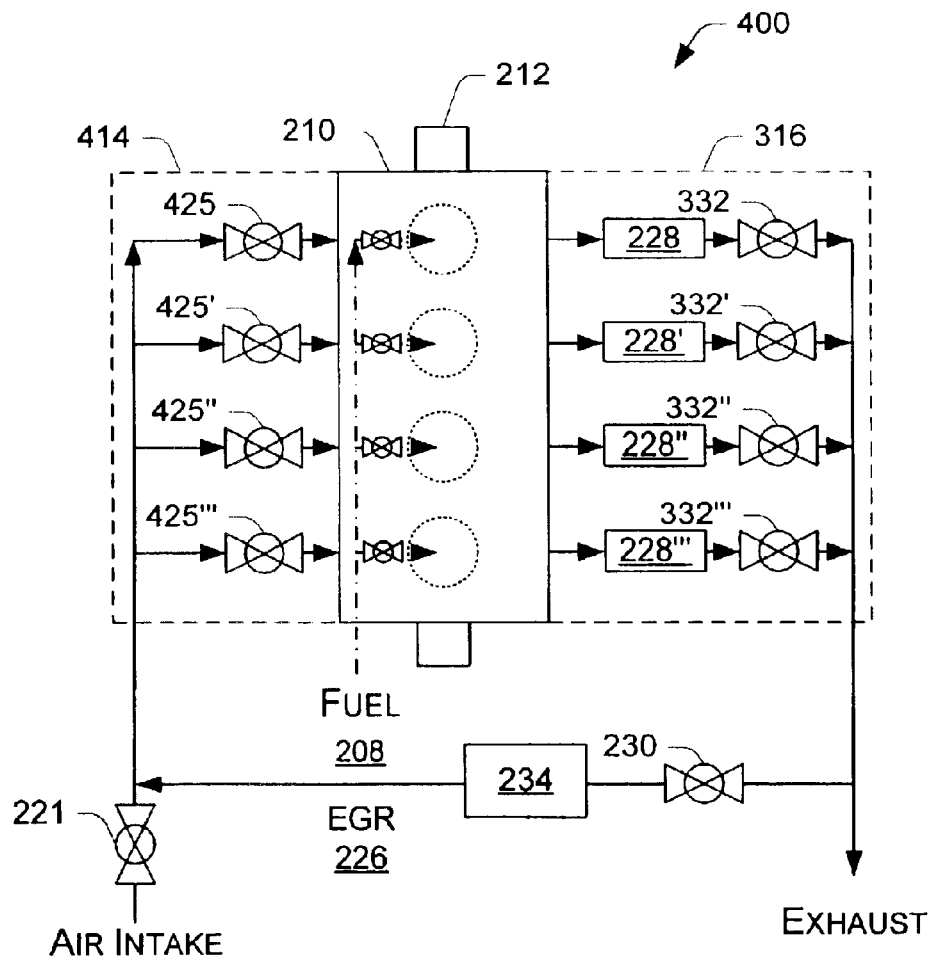
FIG. 4 is a simplified approximate diagram illustrating an exemplary system that includes a one-to-one correspondence between after-treatment units and combustion chambers, regulators to regulate at least intake air pressure and/or flow to individual combustion chambers and regulators to regulate pressure and/or flow to each of the after-treatment units.

FIGS. 2, 3 and 4 show exemplary systems 200, 300, 400, which are suitable for implementing various exemplary methods described herein. The exemplary systems 200, 300, 400 allow for after-treatment regeneration of any particular after-treatment unit wherein a unit receives only part of an engine's exhaust stream. In some instances, components of the exemplary systems 200, 300, 400 are optional. For example, as described in some exemplary methods, operation does not require an exhaust gas recirculation (EGR) system. Further, as described in some exemplary methods, operation includes an exhaust turbine or a turbocharger and optionally a variable geometry mechanism or other mechanism for controlling exhaust flow to a turbine or turbines. Various exemplary methods are presented after the description of the exemplary systems 200, 300, 400.

FIG. 2 shows an exemplary system 200 that includes an exemplary internal combustion engine 210 and turbocharger 220. The internal combustion engine 210 includes an engine block 218 housing a plurality of combustion chambers (e.g., cylinders, etc.) that operatively drive a shaft 212. The turbocharger 220, which optionally includes a variable geometry mechanism or electric generator and/or motor, compresses intake air which circulates to an intake air heat exchanger 223 (e.g., to cool intake air, etc.).

As shown in FIG. 2, an intake system 214 provides a flow path for intake air to the engine block 218 while an exhaust system 216 provides a flow path for exhaust from the engine block 218. The exemplary system 200 further includes a fuel system 208 that can route fuel to individual combustion chambers and an exhaust gas recirculation (EGR) system 226 that can route exhaust gas to the air intake system 214. The EGR system 226 optionally includes an EGR flow regulator 230 and an EGR heat exchanger 234.

The air intake system 214 includes a plurality of flow regulators 224, 224', 224", 224'" that can regulate the flow of exhaust gas to each combustion chamber. Hence, the flow regulators 224, 224', 224'', 224''' can regulate flow rates and regulate air to exhaust gas ratios to each combustion chamber. An alternative exemplary air intake system includes a plurality of flow regulators that can regulate air flow to each combustion chamber and that can regulate the flow of exhaust gas to each combustion chamber. Of course, yet other alternative exemplary air intake systems may have one or more flow regulators to allow for regulation of exhaust gas to one or more combustion chambers and other regulators to allow for regulation of intake air (e.g., on a chamber-by-chamber or any other particular basis). Intake air is supplied to the air intake system 214 via an air intake that optionally includes an intake flow regulator 221.

The exemplary exhaust system 216 allows for after-treatment regeneration of any particular after-treatment unit wherein a unit receives only part of an engine's exhaust stream. The exhaust system 216 includes a plurality of after-treatment units 228, 228', 228'', 228'''; wherein, each combustion chamber of the engine 210 has a respective exhaust stream directed to one of the after-treatment units 228, 228', 228'', 228'''. Exhaust passing through the after-treatment units 228, 228', 228'', 228''' collects, for example, in a manifold to form an exhaust stream. The EGR system 226 branches off the exhaust stream, prior to any exhaust turbine, and can direct exhaust through the EGR heat exchanger 234 and then to the intake system 214.

Positioning of an after-treatment unit prior to a turbine can act to increase temperature of the after-treatment unit. Some units are quite temperature dependent, for example, catalytic units typically operate more effectively at higher temperatures. Such units may benefit from such positioning. Further, after-treatment units for treating exhaust from a single combustion chamber may be considerably smaller than after-treatment units for treating exhaust from a plurality of such combustion chambers. In general, unit size and mass may decrease in relation to the number of combustion chambers assigned to an after-treatment unit. Hence, an exemplary after-treatment unit for treating exhaust from a single combustion chamber has a smaller thermal mass than an after-treatment unit for treating exhaust from a plurality of the combustion chambers. A smaller thermal mass typically equates to a smaller thermal inertia. Hence, such exemplary after-treatment units can allow for more dynamic and/or efficient control and/or operation. Further, a smaller sized unit may allow for a reduction in spatial velocity when compared to a larger unit. Of course, the number of combustion chambers feeding an after-treatment unit and engine operational parameters will also affect spatial velocity.

FIG. 3 shows an exemplary system 300 that includes an exemplary internal combustion engine 210. The internal combustion engine 210 includes an engine block 218 housing a plurality of combustion chambers (e.g., cylinders, etc.) that operatively drive a shaft 212. As shown in FIG. 3, an intake system 214 provides a flow path for intake air to the engine block 218 while an exhaust system 316 provides a flow path for exhaust from the engine block 218. The exemplary system 300 further includes a fuel system 208 that can route fuel to individual combustion chambers and an exhaust gas recirculation (EGR) system 226 that can route exhaust gas to the air intake system 214. The EGR system 226 optionally includes an EGR flow regulator 230 and an EGR heat exchanger 234.

The air intake system 214 includes a plurality of flow regulators 224, 224', 224'', 224''' that can regulate the flow of exhaust gas to each combustion chamber. Hence, the flow regulators 224, 224', 224'', 224''' can regulate flow rates and regulate air to exhaust gas ratios to each combustion chamber. An alternative exemplary air intake system includes a plurality of flow regulators that can regulate air flow to each combustion chamber and that can regulate the flow of exhaust gas to each combustion chamber. Of course, yet other alternative exemplary air intake systems may have one or more flow regulators to allow for regulation of exhaust gas to one or more combustion chambers and other regulators to allow for regulation of intake air (e.g., on a chamber-by-chamber or any other particular basis).

Intake air is supplied to the air intake system 214 via an air intake that optionally includes an intake flow regulator 221. Further, intake air may be supplied to the air intake system 214 at an elevated pressure (e.g., boost pressure) via a compressor or turbocharger.

The exemplary exhaust system 316 allows for after-treatment regeneration of any particular after-treatment unit wherein a unit receives only part of an engine's exhaust stream. The exhaust system 316 includes a plurality of after-treatment units 228, 228', 228'', 228'''; wherein, each combustion chamber of the engine 210 has a respective exhaust stream directed to one of the after-treatment units 228, 228', 228'', 228'''. The exemplary exhaust system 316 further includes a plurality of exhaust regulators 332, 332', 332'', 332'''. Each of the exhaust regulators 332, 332', 332'', 332''' can regulate flow of exhaust from a respective after-treatment unit 228, 228', 228'', 228'''. When compared to the exemplary exhaust system 216 of FIG. 2, the exemplary exhaust system 316 allows for individual regulation of exhaust pressure and flow through each respective after-treatment unit.

Exhaust passing through the after-treatment units 228, 228', 228'', 228''' and exhaust regulators 332, 332', 332'', 332''' collects, for example, in a manifold to form an exhaust stream. Consequently, the exhaust regulators 332, 332', 332'', 332''' can to some degree regulate an individual combustion chamber's contribution to the engine's exhaust. The EGR system 226 branches off the exhaust stream, prior to any exhaust turbine, and can direct exhaust through the EGR heat exchanger 234 and then to the intake system 214.

FIG. 4 shows an exemplary system 400 that includes an exemplary internal combustion engine 210. The internal combustion engine 210 includes an engine block 218 housing a plurality of combustion chambers (e.g., cylinders, etc.) that operatively drive a shaft 212. As shown in FIG. 4, an intake system 414 provides a flow path for intake air to the engine block 218 while an exhaust system 316 provides a flow path for exhaust from the engine block 218. The exemplary system 400 further includes a fuel system 208 that can route fuel to individual combustion chambers and an exhaust gas recirculation (EGR) system 226 that can route exhaust gas to the air intake system 214. The EGR system 226 optionally includes an EGR flow regulator 230 and an EGR heat exchanger 234.

The air intake system 414 includes a plurality of flow regulators 425, 425', 425'', 425''' that can regulate flow of intake air to each combustion chamber. Hence, the flow regulators 425, 425', 425'', 425''' can regulate flow rates to each combustion chamber. Intake air is supplied to the air intake system 414 via an air intake that optionally includes an intake flow regulator 221. Further, intake air may be supplied to the air intake system 414 at an elevated pressure (e.g., boost pressure) via a compressor or turbocharger. When compared to the exemplary air intake systems 214 of FIG. 2 and 314 of FIG. 3, the exemplary intake system 414, where appropriate, relies on exhaust gas recirculation regulated via a common regulator that routes exhaust gas to an air intake manifold.

The exemplary exhaust system 316 allows for after-treatment regeneration of any particular after-treatment unit wherein a unit receives only part of an engine's exhaust stream. The exhaust system 316 includes a plurality of after-treatment units 228, 228', 228", 228'"; wherein, each combustion chamber of the engine 210 has a respective exhaust stream directed to one of the after-treatment units 228, 228', 228", 228'". The exemplary exhaust system 316 further includes a plurality of exhaust regulators 332, 332', 332", 332'". Each of the exhaust regulators 332, 332', 332", 332'" can regulate flow of exhaust from a respective after-treatment unit 228, 228', 228", 228'". When compared to the exemplary exhaust system 216 of FIG. 2, the exemplary exhaust system 316 allows for individual regulation of exhaust pressure and flow through each respective after-treatment unit.

Exhaust passing through the after-treatment units 228, 228', 228", 228'" and exhaust regulators 332, 332', 332", 332'" collects, for example, in a manifold to form an exhaust stream. Consequently, the exhaust regulators 332, 332', 332", 332'" can to some degree regulate an individual combustion chamber's contribution to the engine's exhaust. The EGR system 226 branches off the exhaust stream, prior to any exhaust turbine, and can direct exhaust through the EGR heat exchanger 234 and then to the intake system 214.

Figure 5:
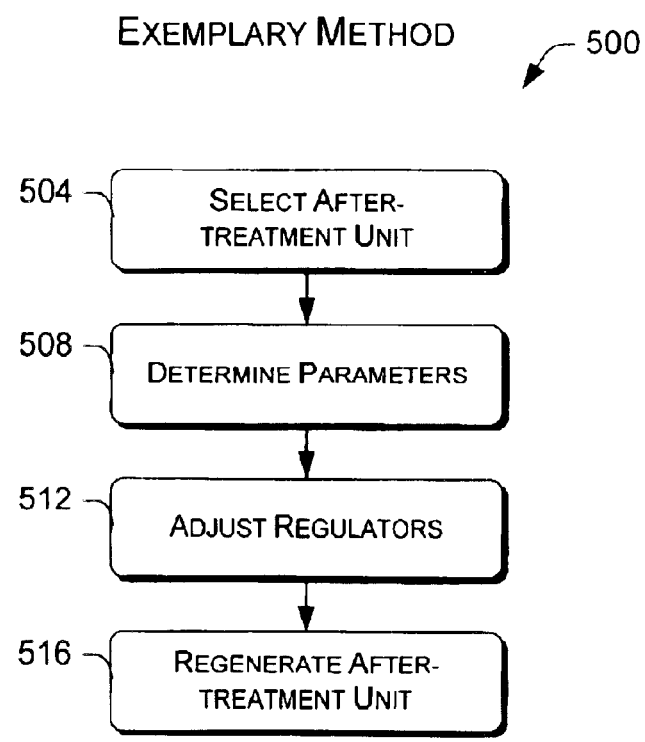
FIG. 5 is a block diagram illustrating an exemplary method suitable for regeneration of an after-treatment unit.

FIG. 5 shows an exemplary method 500 for regenerating an after-treatment unit. The method 500 commences in a selection block 504 wherein an after-treatment unit is selected for regeneration. A determination block 508 follows that determines one or more parameter values. For example, a determination block may determine an appropriate air to fuel ratio for regenerating the selected after-treatment unit. An air to fuel ratio is optionally a pre-combustion air to fuel ratio or a post-combustion air to fuel ratio. An adjustment block 512 allows for adjusting one or more regulators in a manner suitable to achieve the desired parameter value(s) (e.g., to achieve a desired air to fuel ratio, etc.). A regeneration block 516 follows wherein regeneration of the selected after-treatment unit occurs. The exemplary method 500 optionally repeats, as desired, for a series of after-treatment units. For example, if an engine has four cylinders and an after-treatment unit for each cylinder, the selection may repeat according to a firing order (e.g., 1-3-2-4, etc.) or some other order. In general, regeneration of an after-treatment unit occurs at a frequency less than the firing frequency of a chamber. Further, an exemplary method may select more than one after-treatment unit and adjust parameters for associated combustion chambers. Yet further, an exemplary method may select an after-treatment unit having a plurality of associated combustion chambers wherein the number of associated combustion chambers is typically less than the total number of combustion chambers for the engine.

With reference to the exemplary systems 200, 300, 400 of FIGS. 2, 3, and 4, the selection block 504 may select an after-treatment unit from the after-treatment units 228, 228', 228", 228'". In the exemplary system 200, the adjustment block 512 may adjust any of the various regulators to achieve one or more parameter values, such as, a desired air to fuel ratio, etc. For example, the adjustment block 512 may adjust regulators associated with the fuel system 208, the EGR system 238, and/or the air intake system 214. Exemplary adjustment parameters that may be individually and directly adjustable for each combustion chamber include, but are not limited to, intake air pressure, intake air flow, EGR pressure, EGR flow, fuel flow, and fuel pressure. Further, if the exemplary system 200 includes a variable geometry turbine, then the adjustment block 512 may adjust the geometry to thereby affect exhaust pressure and flow. In turn, an adjustment to a variable geometry turbine may affect EGR pressure and flow. Further, an adjustment to a variable geometry turbine may affect operation of an associated compressor (e.g., as part of a turbocharger), which, in turn, may affect pressure and flow of intake air.

With respect to the exemplary system 300 of FIG. 3, the adjustment block 512 may adjust any of the various regulators to achieve one or more parameter values, such as, a desired air to fuel ratio, etc. For example, the adjustment block 512 may adjust regulators associated with the fuel system 208, the EGR system 238, the air intake system 214 and/or the exhaust system 316. Exemplary adjustment parameters that may be individually and directly adjustable for each combustion chamber include, but are not limited to, intake air pressure, intake air flow, EGR pressure, EGR flow, exhaust flow, exhaust pressure, fuel flow, and fuel pressure. Further, if the exemplary system 300 includes a variable geometry turbine, then the adjustment block 512 may adjust the geometry to thereby affect exhaust pressure and flow. In turn, an adjustment to a variable geometry turbine may affect EGR pressure and flow. Further, an adjustment to a variable geometry turbine may affect operation of an associated compressor (e.g., as part of a turbocharger), which, in turn, may affect pressure and flow of intake air.

With respect to the exemplary system 400 of FIG. 4, the adjustment block 512 may adjust any of the various regulators to achieve one or more parameter values, such as, a desired air to fuel ratio, etc. For example, the adjustment block 512 may adjust regulators associated with the fuel system 208, the EGR system 238, the air intake system 414 and/or the exhaust system 316. Exemplary adjustment parameters that may be individually and directly adjustable for each combustion chamber include, but are not limited to, intake air pressure, intake air flow, exhaust flow, exhaust pressure, fuel flow, and fuel pressure. Further, if the exemplary system 300 includes a variable geometry turbine, then the adjustment block 512 may adjust the geometry to thereby affect exhaust pressure and flow. In turn, an adjustment to a variable geometry turbine may affect EGR pressure and flow. Further, an adjustment to a variable geometry turbine may affect operation of an associated compressor (e.g., as part of a turbocharger), which, in turn, may affect pressure and flow of intake air.

Figure 6:
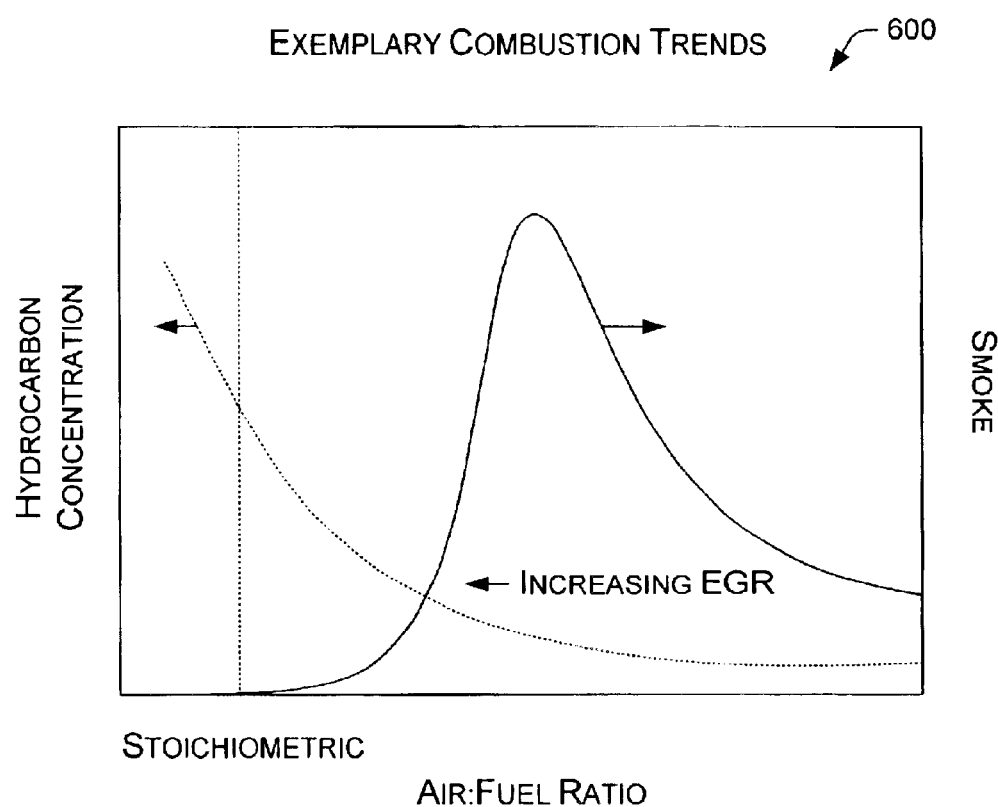
FIG. 6 is a plot showing exemplary combustion trends.

FIG. 6 shows a plot 600 of exemplary trends for hydrocarbon concentration and smoke versus air to fuel ratio. Such trends have been shown to exist for low temperature combustion (LTC) operation in diesel engines. According to one LTC scheme, a relatively high EGR flow is introduced into an intake manifold that feeds a plurality of combustion chambers (see, e.g., arrow for direction of increasing EGR with respect to intake air). Such a scheme is described in Akihama, et al., "Mechanism of the Smokeless Rich Diesel Combustion by Reducing Temperature", SAE 2001 World Congress (No. 2001-01-0655), March 2001 (Detroit, Mich.), which is incorporated by reference herein. In this LTC scheme, the relatively high EGR flow acts to reduce temperature and oxygen concentration of intake air directed to the plurality of combustion chambers. Use of an EGR cooler may allow for cooling of recirculated exhaust gas. Trends exhibited by such a LTC scheme include an increase in hydrocarbon concentration (e.g., a "rich spike", etc.) and a decrease in smoke (e.g., soot, etc.) as air to fuel ratio approaches a stoichiometric ratio (e.g., as the air to fuel ratio becomes less than some critical ratio). Yet further, such a LTC scheme can reduce NOx emissions from the combustion chambers.

The generation of a "rich spike" can aid regeneration of some after-treatment units. For example, the hydrocarbons associated with the "rich spike" can be carried by the exhaust to a NOx after-treatment unit. Once in the NOx after-treatment unit, the hydrocarbons can react (e.g., oxidize, etc.) and release heat. The released heat can increase temperature of the NOx unit and thereby facilitate regeneration. However, according to conventional LTC schemes, "rich spike" generation can cause a decrease in engine power or other performance glitch.

Figure 7:
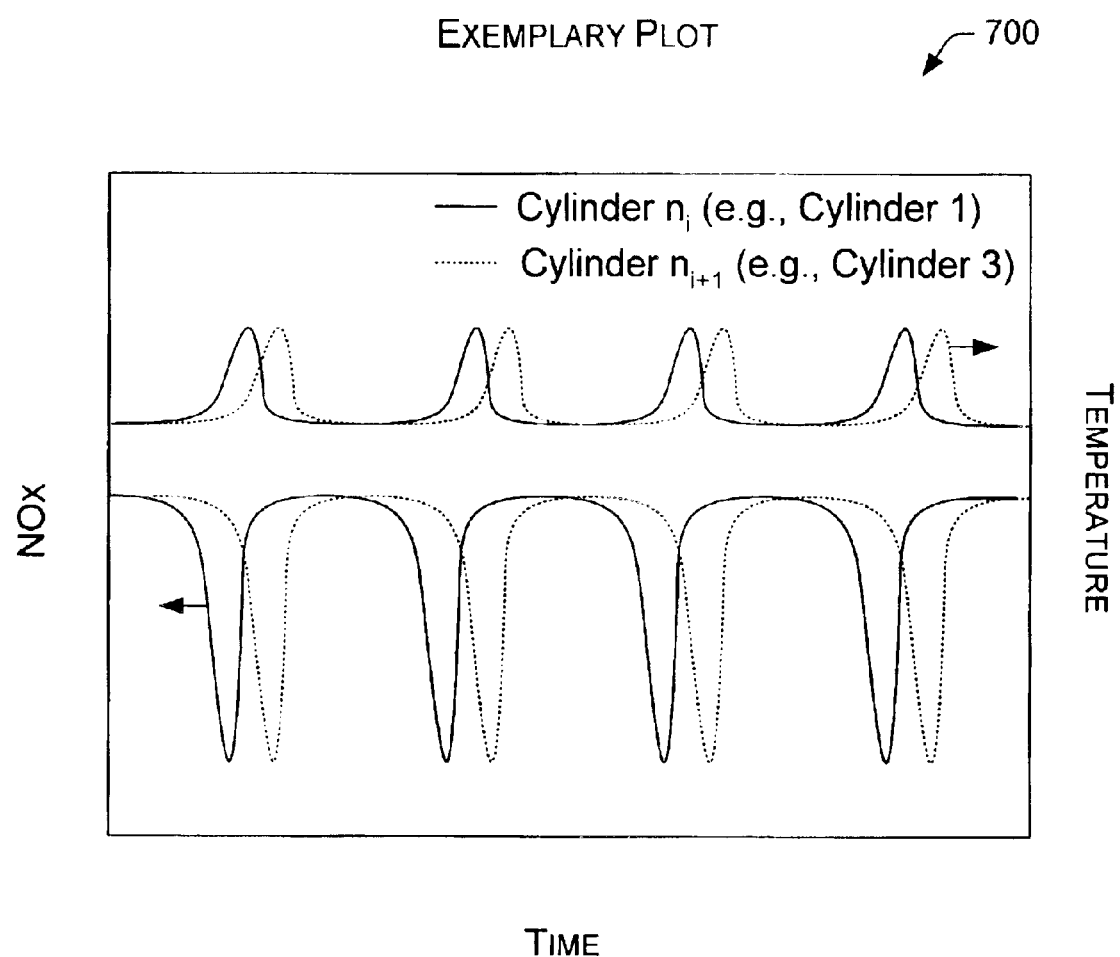
FIG. 7 is an exemplary plot of NOx and after-treatment unit temperature versus time for an exemplary method of regeneration.

An exemplary method aims to reduce, minimize and/or eliminate issues associated with conventional LTC schemes by generating a rich spike that is limited to less than all of an engine's combustion chambers. For example, an exemplary method generates a rich spike on a combustion chamber by combustion chamber basis. FIG. 7 shows a plot 700 of NOx concentration and after-treatment unit temperature corresponding to such an exemplary method. More specifically, the plot 700 shows NOx data for a first combustion chamber (e.g., cylinder $n_i$, cylinder 1 of 4, etc.) and NOx data for a second combustion chamber (e.g., cylinder $n_{i+1}$, cylinder 3 of 4, etc.) wherein rich spike generation on a combustion chamber by combustion chamber basis causes periodic reductions in NOx emissions. Further, rich spike generation on a combustion chamber by combustion chamber basis causes periodic temperature increases in one or more associated after-treatment units. Again, an increase in temperature can be part of and/or facilitate after-treatment unit regeneration.

Figure 8:
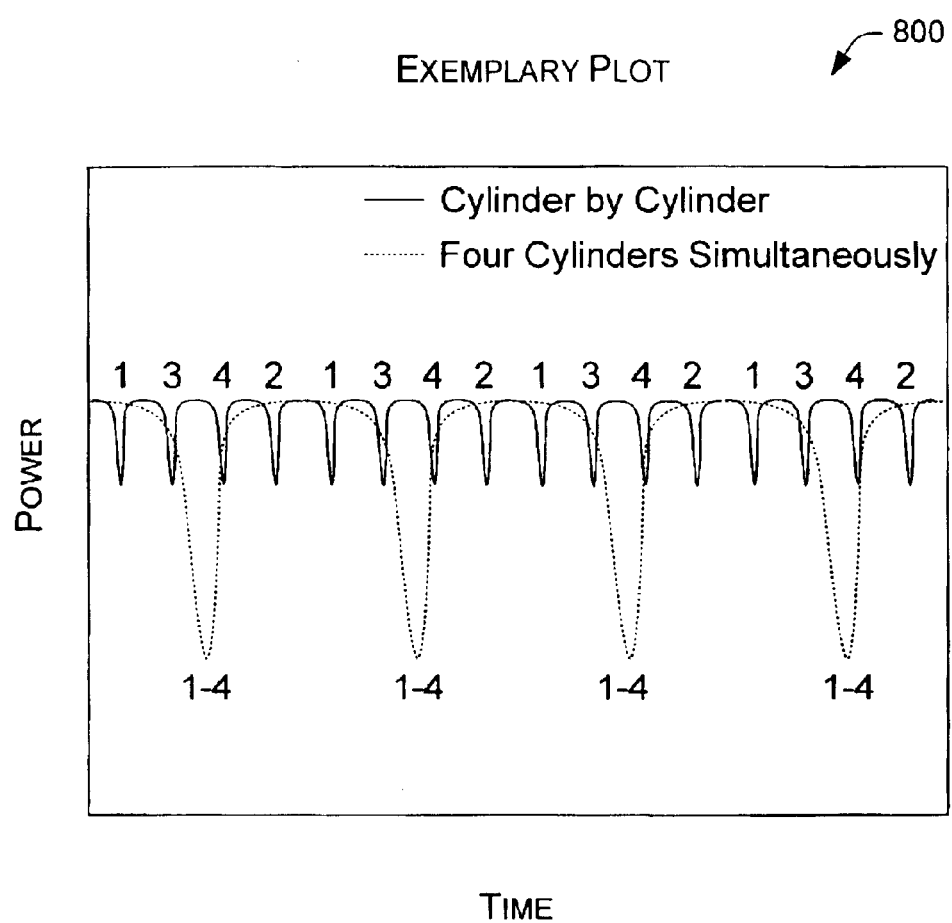
FIG. 8 is an exemplary plot of power versus time for an exemplary method of regeneration.

FIG. 8 shows an exemplary plot 800 of power versus time for an exemplary method and a conventional method of after-treatment regeneration. The exemplary method corresponds to combustion chamber by combustion chamber rich spike generation and/or low temperature combustion; whereas, the conventional method corresponds to rich spike generation and/or low temperature combustion for all combustion chambers in a substantially simultaneous manner. For example, the exemplary method may be implemented on a four cylinder engine having a firing order or 1-3-4-2 wherein rich spike generation and/or low temperature combustion occurs first for cylinder 1, then for cylinder 3, then for cylinder 4, and then for cylinder 2. In contrast, the conventional method would result in substantially simultaneous rich spike generation and/or low temperature combustion for all the cylinders 1, 2, 3 and 4.

According to the exemplary method, a combustion chamber is selected for rich spike generation and/or low temperature combustion. Next, one or more regulators are adjusted to generate a rich spike and/or to achieve low temperature combustion for the selected combustion chamber. The overall effect of this exemplary method is to reduce the magnitude of power transients. For example, the exemplary method produces smaller power transients than the conventional method. While the conventional method may produce fewer power transients (e.g., lesser frequency), the exemplary method reduces the magnitude of the power transients, which acts to minimize the affect of any particular transient on performance. Of course, such an exemplary method may select more than one combustion chamber and less than all the combustion chambers. Alternatively, such an exemplary method may select less than all after-treatment units and then associate the selected units with less than all combustion chambers.

Further, various exemplary methods and/or systems can control exhaust flow through an after-treatment unit. For example, a reduction in space velocity during regeneration may help to minimize any fuel economy penalty associated with operation of the after-treatment unit. Further, control of various adjustment parameters may allow for a decrease in oxygen concentration in an exhaust stream to a NOx after-treatment unit to thereby help create a reducing environment to facilitate regeneration of the NOx after-treatment unit. In this manner, hydrocarbons are less likely to react with oxygen prior to reaction in an after-treatment unit. More specifically, after-treatment units for NOx typically operate according to a sorption and regeneration cycle. During a sorption phase, NOx sorption occurs in an oxidative environment (e.g., sufficient exhaust oxygen and little exhaust hydrocarbon, i.e., lean); whereas, during a regeneration phase, adsorbed NOx is released and/or reduced to $N_2$ in a reducing environment (e.g., little or no exhaust oxygen and sufficient exhaust hydrocarbon, i.e., rich). Overall, the following simplified equations (e.g., stoichiometric amounts not indicated) may exemplify a sorption and regeneration cycle:

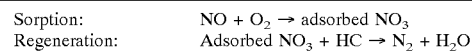

| Sorption: | $NO + O_2 \rightarrow$ adsorbed $NO_3$ |
| Regeneration: | Adsorbed $NO_3 + HC \rightarrow N_2 + H_2O$ |

Again, while some exhaust oxygen may be present during a regeneration phase, the concentration of such exhaust oxygen is typically significantly less than in a sorption phase. Hence, various exemplary methods aim to periodically increase hydrocarbon (HC) concentration to one or more after-treatment units and/or to decrease oxygen concentration to the one or more after-treatment units. In general, such an exemplary method increases HC concentration and/or decreases oxygen concentration to one or more after-treatment unit by regulating parameters associated one or more combustion chambers wherein the one or more combustion chambers number less than all of the combustion chambers. As described below, such exemplary methods and/or other exemplary methods may regulate parameters associated with other combustion chambers to achieve or maintain certain engine operating conditions.

Figure 9:
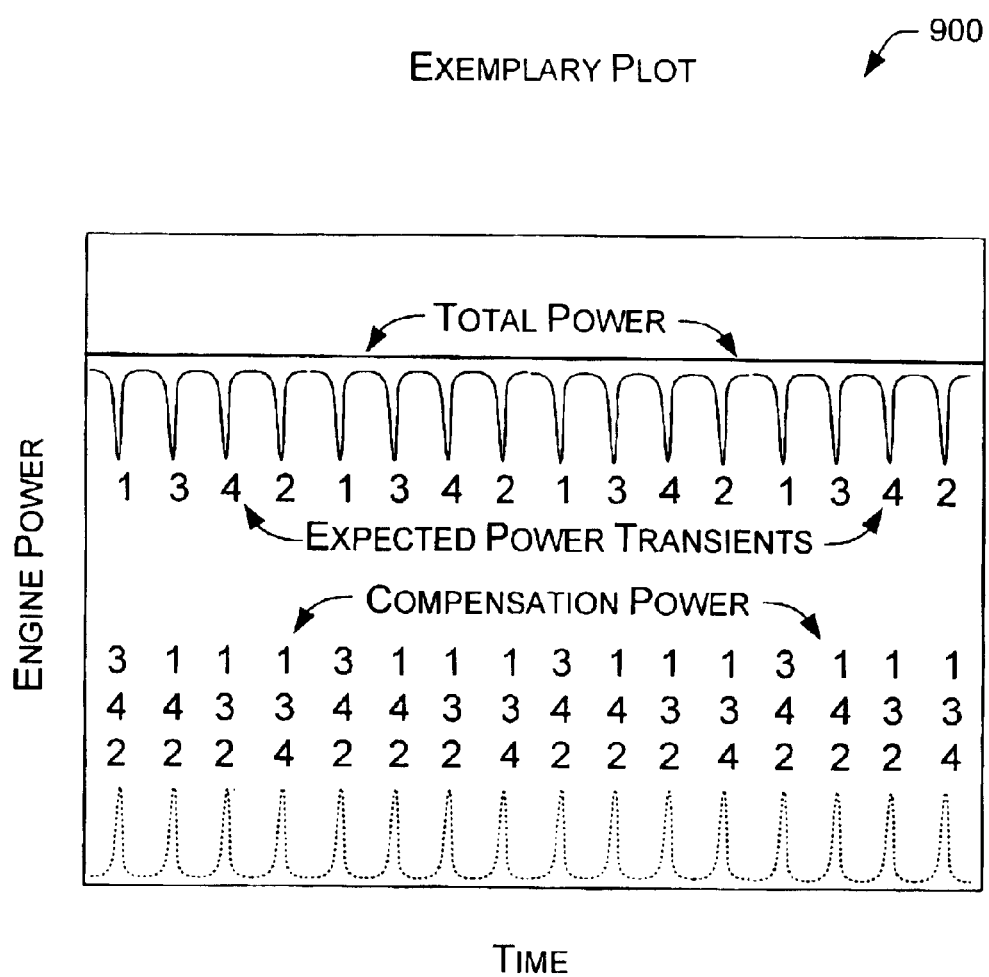
FIG. 9 is an exemplary plot of power versus time for an exemplary method of regeneration with power compensation.

FIG. 9 shows an exemplary plot 900 of engine power versus time for an exemplary method. The plot 900 includes expected power transients and compensation power transients that result in a total power. In this particular example, the total power remains substantially constant with respect to time. Of course, total power could vary based on operating conditions (e.g., operator demand, etc.). More specifically, the plot 900 shows expected power transients for a four cylinder engine having a firing order 1-3-4-2 (see, e.g., the plot 800 of FIG. 8). To compensate for the expected power transients, an exemplary method increases power generated by one or more of the other cylinders. For example, if parameters associated with cylinder 1 are adjusted to generate a rich spike, then parameters for one or more of cylinders 2, 3 and 4 may be adjusted to compensate for cylinder 1's expected power transient. Conventional schemes that rely on all of an engine's cylinders to generate a rich spike substantially simultaneously cannot effectively compensate for the resulting power transient in this manner. Such an exemplary method may also control a turbine, a compressor or a turbocharger to compensate (e.g., as an alternative or in addition to control of other currently "non-regenerative" chambers).

Figure 10:
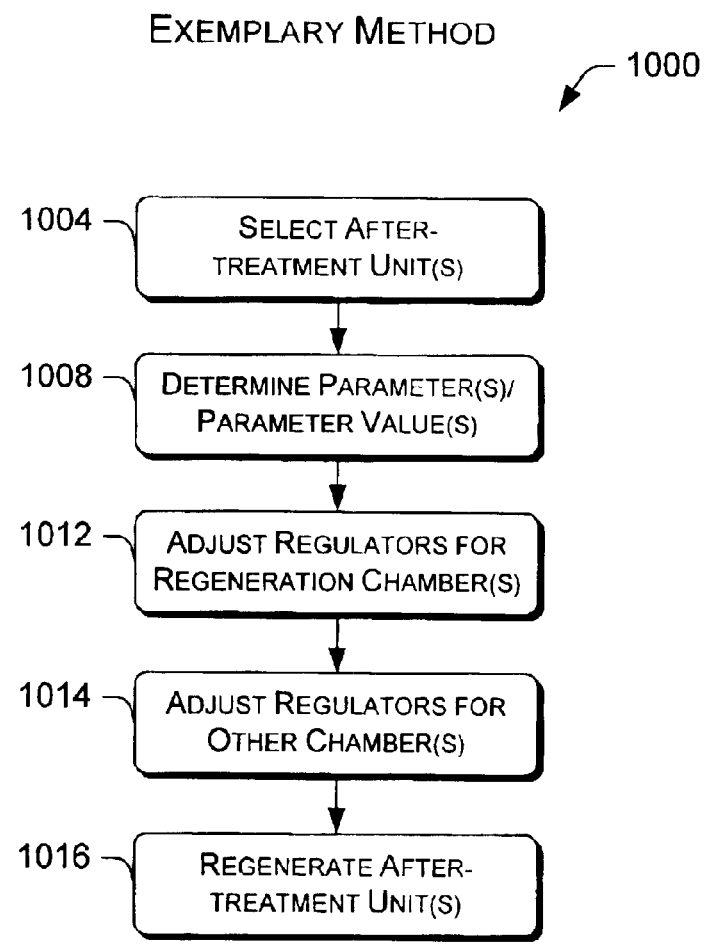
FIG. 10 is a block diagram of an exemplary method suitable for regeneration of one or more after-treatment units.

FIG. 10 shows a block diagram of an exemplary method 1000 for regenerating one or more after-treatment units. In a selection block 1004, one or more after-treatment units are selected for regeneration. A determination block 1008 follows that determines which parameters require adjustment and/or determines values for one or more of the parameters. In this block, the exemplary method 1000 may determine a value for a parameter associated with a certain combustion chamber to generate a rich spike while also determining a value for a parameter associated with another combustion chamber to compensate for an expected power transient. Various adjustment blocks 1012, 1014 follow which adjust regulators according to one or more parameter values. For example, a first set of parameter values may be used to adjust one or more regulators associated with a combustion chamber and a corresponding after-treatment unit while a second set of parameter values may be used to adjust one or more regulators associated with one or more other combustion chambers and/or other after-treatment units. The exemplary method 1000 continues in a regeneration block 1016 wherein the one or more selected after-treatment units experiences conditions favorable to regeneration (e.g., increase in HC, decrease in oxygen, etc.).

The exemplary method 1000 is suitable for implementation using a controller. For example, in an engine system (e.g., exemplary engine systems 200, 300, 400, etc.) that includes a plurality of combustion chambers and a plurality of after-treatment units, an exemplary controller can selectively control air to fuel ratio to less than all of the combustion chambers to thereby selectively cause less than all of the after-treatment units to receive exhaust having hydrocarbon and oxygen concentrations that favor after-treatment unit regeneration. For example, a V6 engine may have a first after-treatment unit for a first bank of three cylinders and a second after-treatment unit for a second bank of three cylinders. According to such an exemplary method, a controller may selectively control air to fuel ratio to the first bank of three cylinders to thereby selectively cause the first after-treatment unit to receive exhaust having hydrocarbon and oxygen concentrations that favor after-treatment unit regeneration (e.g., typically an increased hydrocarbon concentration and a decreased oxygen concentration). Thus, in the example of the V6 engine, an engine has more than one group of combustion chambers wherein each group has an associated after-treatment unit. Of course, as mentioned previously, each combustion chamber may have an associated after-treatment unit.

Another exemplary method includes injecting fuel into an exhaust stream associated with less than all combustion chambers of an engine, typically via an exhaust fuel regulator positioned on an exhaust outlet of a combustion chamber. Any exemplary engine system (see, e.g., the systems 200, 300, 400, etc.) may have a plurality of such exhaust fuel regulators to inject fuel into an associated exhaust stream (e.g., on a combustion chamber by combustion chamber basis or other basis). Conventionally, an exhaust fuel regulator to inject fuel into an exhaust manifold has been part of an exhaust port injection scheme that can increase hydrocarbon concentration in an exhaust manifold. In contrast, an exemplary method uses a plurality of exhaust fuel regulators to adjust hydrocarbon concentration in a plurality of exhaust streams. For example, such an exemplary method may adjust the flow of exhaust fuel to less than all of the exhaust streams and then adjust the flow of exhaust fuel to other of the exhaust streams. In a V6 engine, such an exemplary method may operate to adjust the flow of exhaust fuel to a first exhaust manifold that collects exhaust from three combustion chambers and directs the collected exhaust to a first after-treatment unit and then adjust the flow of exhaust fuel to a second exhaust manifold that collects exhaust from three other combustion chambers and directs the collected exhaust to a second after-treatment unit. In this manner, regeneration of the first after-treatment unit and the second after-treatment unit may be controlled independently.

Various exemplary methods that include post-combustion chamber injection of fuel to an exhaust stream may augment various other methods described herein. For example, a decrease in exhaust oxygen concentration may occur via an EGR control while an increase in hydrocarbon concentration may occur via an exhaust fuel regulator. For example, an engine system that includes a plurality of combustion chambers, each having an associated EGR regulator, may implement an exemplary method that increases EGR on a combustion chamber by combustion chamber basis. In this example, each EGR increase may be coordinated with injection of fuel into a corresponding exhaust stream of a combustion chamber. Such an exemplary method may also be beneficial to augment a rich spike and thereby further increase exhaust hydrocarbon concentration.

Figure 11:
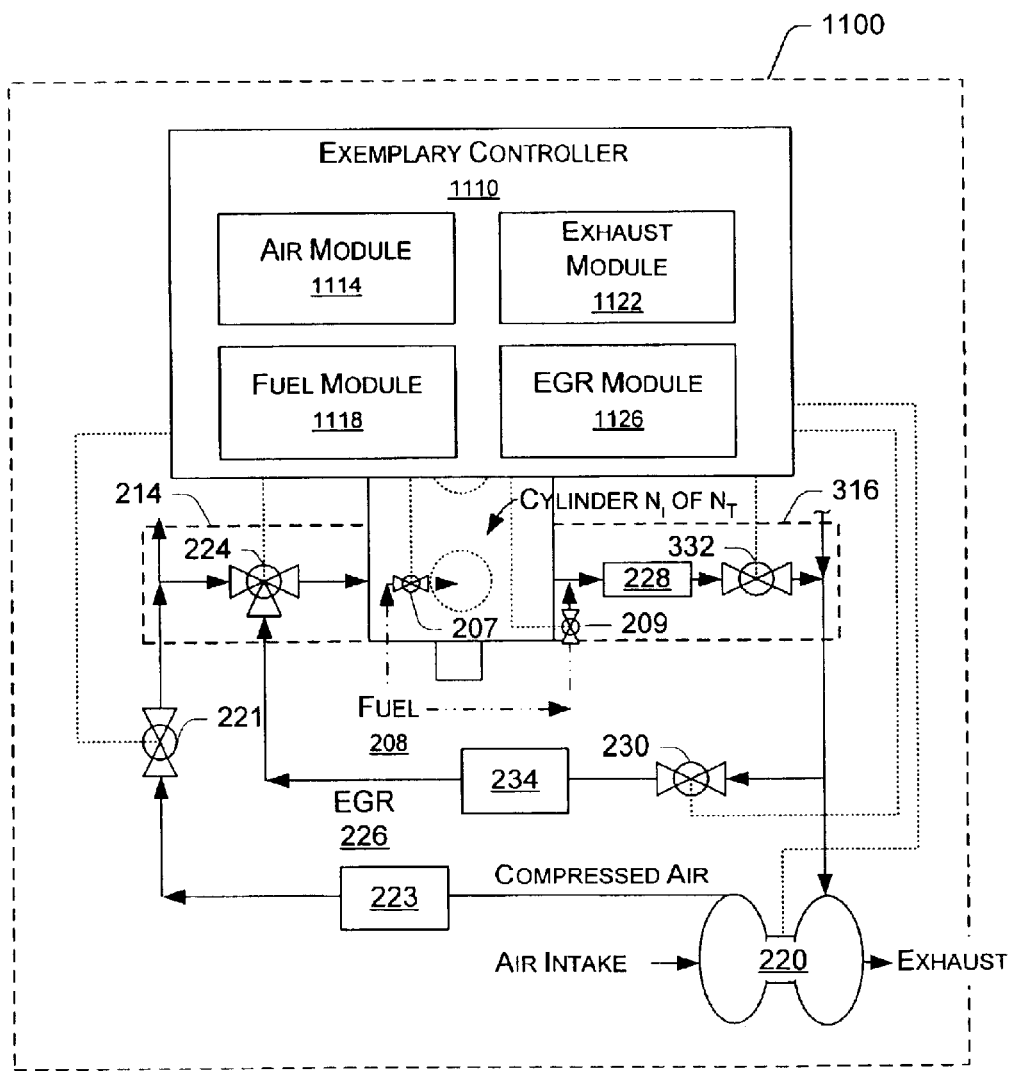
FIG. 11 is a block diagram illustrating an exemplary controller for controlling regeneration and/or other engine operations.

FIG. 11 shows an exemplary system 1100 that includes an exemplary controller 1110 for adjusting various regulators. Note, that for ease of description, not all of the combustion chambers or regulators are shown in FIG. 11. The exemplary system 1100 includes a plurality of combustion chambers, such as, cylinder $n_i$ of $n_T$, where $n_T$ is the total number of cylinders. The cylinder $n_i$ has associated regulators, such as, an air intake/EGR regulator 224, an exhaust regulator 332, an intake fuel regulator 207, and an exhaust fuel regulator 209. While the intake fuel regulator 207 (an engine system typically has a plurality, e.g., one per combustion chamber) regulates fuel to the cylinder $n_i$, the exhaust fuel regulator 209 regulates fuel to an exhaust. Any exemplary engine system (see, e.g., the systems 200, 300, 400, etc.) may have a plurality of such exhaust fuel regulators to inject fuel into an exhaust stream.

The exemplary system 1100 also includes various system regulators (e.g., air intake regulator 221, EGR regulator 230, etc.). Further, the exemplary system 1100 includes a controller for controlling a various aspects of a turbine, a compressor, or a turbocharger (e.g., variable geometry or other). Of course, other engine control systems and/or associated equipment may be used to implement various exemplary methods presented herein. For example, valves and valve timing are optionally used to adjust air to fuel ratio, EGR, exhaust, etc. or as adjustment parameters.

The exemplary controller 1110 includes an air module 1114 for controlling intake air pressure and/or flow to the chamber $n_i$, a fuel module 1118 for controlling fuel pressure and/or flow to the chamber $n_i$ (and optionally fuel pressure and/or flow to an exhaust of the cylinder $n_i$), an exhaust module 1122 for controlling exhaust pressure and/or flow from the chamber $n_i$, and an EGR module 1126 for controlling pressure and/or flow of EGR to the chamber $n_i$. Of course, the exemplary controller 1110 may include other modules for controlling various parameters germane to operation of an engine or engine system.

The exemplary controller 1110 typically includes control logic for selectively controlling air to fuel ratio to less than all of the combustion chambers to thereby selectively cause less than all of the after-treatment units to receive exhaust having hydrocarbon and oxygen concentrations that favor after-treatment unit regeneration. Such logic may depend on other engine system parameters, such as, but not limited to, demand, engine speed, load, type and number of after-treatment units, fuel quality, air quality, altitude, etc. Exemplary control logic schedules regeneration for a plurality of after-treatment units. Further, exemplary control logic may compensate for any expected decrease in engine performance associated with such a schedule and/or other engine operating conditions.

Various exemplary methods, devices and/or systems allow for regeneration of after-treatment units on a combustion chamber by combustion chamber basis wherein each combustion chamber has an associated after-treatment unit. Accordingly, the impact of regeneration on an engine may be reduced by a factor equal to the number of combustion chambers. As an example, regenerating a NOx unit (e.g., a trap, etc.) may require reducing mass flow to one cylinder by a factor of two, which impacts total mass flow by 8% on a 6 cylinder engine, in contrast to reducing mass flow by a factor of 50% for regeneration of a NOx unit that handles emissions from all cylinders. Other exemplary methods, device and/or systems allow for regeneration of an after-treatment unit by controlling parameters associated with less than all combustion chambers of an engine.

An exemplary system and/or method may accomplish such a reduced impact by including one or more valves in an intake manifold or an air intake system (e.g., exemplary air intake systems 214, 414) or through use of variable valve timing on an engine. According to various exemplary methods, oxygen flow can be reduced through any particular combustion chamber, the fuel flow increased, or the two combined to achieve a rich condition (e.g., a rich spike, etc.) suitable for NOx after-treatment unit regeneration. Various exemplary methods are suitable for use to increase temperature of a diesel particulate filter and thus cause regeneration of such an after-treatment unit.

Further, according to various exemplary methods and/or systems, after-treatment units are positioned prior to any exhaust turbine to thereby allow the units to be exposed to higher exhaust temperatures, which can result in a need for a lesser change in air to fuel ratio to achieve regeneration and optionally an increase in economy (e.g., fuel economy, etc.). Yet further, various exemplary methods and/or systems mitigate changes in combustion chamber conditions at or near the point of after-treatment unit regeneration and hence have less affect on exhaust turbine performance when compared to a conventional after-treatment unit positioned after an exhaust turbine.

While various exemplary systems and/or methods are shown individually in various figures, yet other exemplary systems and/or method optionally implement a combination of features. Although some exemplary methods, devices and systems have been illustrated in the accompanying Drawings and described in the foregoing Detailed Description, it will be understood that the methods and systems are not limited to the exemplary methods, devices and/or systems disclosed, but are capable of numerous rearrangements, modifications and substitutions without departing from the spirit set forth and defined by the following claims.

What is claimed is:

1. A controller for use with a diesel engine system having an exhaust turbine, a plurality of combustion chambers and a plurality of NOx after-treatment units positioned upstream of the exhaust turbine comprising: control logic for selectively controlling air to fuel ratio to less than all of the combustion chambers to thereby selectively cause less than all of the NOx after-treatment units to receive exhaust having hydrocarbon and oxygen concentrations that favor NOx after-treatment unit regeneration.

2. The controller of claim 1 wherein the controller controls geometry of the exhaust turbine.

3. The controller of claim 1, wherein the control logic includes a schedule for regenerating the plurality of NOx after-treatment units.

4. The controller of claim 3 wherein the schedule depends on engine operating conditions.

5. One or more computer-readable media having instructions thereon that are executable by a computer to perform actions comprising:
adjusting air to fuel ratio for less than all of a plurality of diesel combustion chambers to thereby cause less than all of a plurality of NOx after-treatment units to receive exhaust, upstream of an exhaust turbine, having hydrocarbon and oxygen concentrations that favor regeneration of the less than all the NOx after-treatment units.

6. A controller comprising:
means for adjusting air to fuel ratio for less than all of a plurality of diesel combustion chambers to thereby cause less than all of a plurality of NOx after-treatment units to receive exhaust, upstream of an exhaust turbine, having hydrocarbon and oxygen concentrations that favor regeneration of the less than all the NOx after-treatment units.

7. A diesel engine system comprising:
an exhaust turbine;
a plurality of combustion chambers capable of providing exhaust to the exhaust turbine;
a plurality of NOx after-treatment units positioned upstream of the exhaust turbine and each unit capable of receiving exhaust from at least one of the combustion chambers;
a controller to selectively control air to fuel ratio to less than all of the combustion chambers to thereby selectively cause less than all of the NOx after-treatment units to receive exhaust having hydrocarbon and oxygen concentrations that favor NOx after-treatment unit regeneration.

8. The diesel engine system of claim 7 wherein each of the plurality of NOx after-treatment units is configured to receive exhaust from one of the plurality of combustion chambers.

9. The diesel engine system of claim 7 wherein the exhaust turbine is operatively coupled to an air compressor.

10. The diesel engine system of claim 7 wherein the exhaust turbine comprises a variable geometry exhaust turbine.

11. The diesel engine system of claim 10 wherein the controller controls the geometry of the variable geometry exhaust turbine.

12. The diesel engine system of claim 7 further comprising a plurality of regulators to regulate exhaust gas recirculation to the plurality of combustion chambers.

13. The diesel engine system of claim 12 wherein the plurality of regulators allow for independent regulation of exhaust gas recirculation to each of the plurality of combustion chambers.

14. An engine system comprising:
a plurality of combustion chambers;
a plurality of after-treatment units;
a controller to selectively control air to fuel ratio to less than all of the combustion chambers to thereby selectively cause less than all of the after-treatment units to receive exhaust having hydrocarbon and oxygen concentrations that favor after-treatment unit regeneration; and
a plurality of regulators to regulate exhaust gas recirculation to the plurality of combustion chambers.

15. The diesel engine system of claim 14 wherein the plurality of regulators allow for independent regulation of exhaust gas recirculation to each of the plurality of combustion chambers.

16. A method of operating a diesel engine system having an exhaust turbine, a plurality of combustion chambers and a plurality of NOx after-treatment units positioned upstream of the exhaust turbine comprising:
selecting less than all of the plurality of NOx after-treatment units; and
adjusting air to fuel ratio for less than all of the plurality of combustion chambers to thereby cause the selected NOx after-treatment units to receive exhaust having hydrocarbon and oxygen concentrations that favor regeneration of the selected NOx after-treatment units.

17. The method of claim 16 further comprising adjusting geometry of the exhaust turbine.

18. The method of claim 16 wherein the adjusting increases hydrocarbon concentration.

19. The method of claim 16 wherein the adjusting decreases oxygen concentration.

20. The method of claim 16 wherein the adjusting increases hydrocarbon concentration and decreases oxygen concentration.

21. The method of claim 16 wherein the selecting selects one of the after-treatment units and the adjusting adjusts an air to fuel ratio for one of the plurality of combustion chambers.

22. The method of claim 16 wherein the adjusting adjusts parameters for other of the plurality of combustion chambers.

23. The method of claim 16 wherein the adjusting adjusts exhaust gas recirculation.

24. The method of claim 23 wherein the adjusting adjusts exhaust gas recirculation on a combustion chamber by combustion chamber basis.

25. The method of claim 16 further comprising compensating for any expected performance detriment caused by the adjusting.

26. The method of claim 25 wherein the compensating includes adjusting operational parameters for other of the plurality of combustion chambers.

27. A method of operating an engine system comprising:
selecting less than all of a plurality of after-treatment units; and
adjusting air to fuel ratio for less than all of a plurality of combustion chambers, wherein the adjusting adjusts exhaust gas recirculation on a combustion chamber by combustion chamber basis, to thereby cause the selected after-treatment units to receive exhaust having hydrocarbon and oxygen concentrations that favor regeneration of the selected after-treatment units.

* * * * *